(12) United States Patent
Bergkoetter et al.

(10) Patent No.: US 9,416,736 B2
(45) Date of Patent: Aug. 16, 2016

(54) METHOD AND APPARATUS FOR CONTROLLING AN INTERNAL COMBUSTION ENGINE DURING A COMBUSTION TRANSITION

(71) Applicant: GM GLOBAL TECHNOLOGY OPERATIONS LLC, Detroit, MI (US)

(72) Inventors: Brenton J. Bergkoetter, Milford, MI (US); Christopher E. Whitney, Commerce, MI (US); Brian L. Spohn, Holly, MI (US); Sean W. McGrogan, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 14/132,032

(22) Filed: Dec. 18, 2013

(65) Prior Publication Data
US 2015/0166037 A1    Jun. 18, 2015

(51) Int. Cl.
*F02D 41/12*    (2006.01)
*F02D 13/06*    (2006.01)

(52) U.S. Cl.
CPC ............... *F02D 13/06* (2013.01); *Y10T 477/79* (2015.01)

(58) Field of Classification Search
CPC .. F02D 41/0087; F02D 41/126; F02D 41/123
USPC ......................................................... 477/181
See application file for complete search history.

(56) References Cited

U.S. PATENT DOCUMENTS

| | | | | |
|---|---|---|---|---|
| 4,512,154 A | * | 4/1985 | Ueno | .............................. 60/626 |
| 5,205,152 A | * | 4/1993 | Clarke et al. | ......................... 73/9 |
| 5,832,885 A | * | 11/1998 | Moyer | ....................... 123/90.16 |
| 2013/0247854 A1 | * | 9/2013 | Tai | ........................... B60K 6/12 |
| | | | | 123/90.15 |
| 2014/0288807 A1 | * | 9/2014 | Tribulowski et al. | ......... 701/112 |

FOREIGN PATENT DOCUMENTS

WO    WO2013/083472    *    6/2013    .................... 701/112

* cited by examiner

*Primary Examiner* — Robert Hodge
*Assistant Examiner* — Stacey Fluhart

(57) ABSTRACT

A method for operating an internal combustion engine includes increasing engine drag torque, transitioning from a cylinder deactivation state to an all-cylinder state, and decreasing engine drag torque immediately subsequent to transitioning to the all-cylinder state.

10 Claims, 3 Drawing Sheets

METHOD AND APPARATUS FOR CONTROLLING AN INTERNAL COMBUSTION ENGINE DURING A COMBUSTION TRANSITION

TECHNICAL FIELD

This disclosure is related to control of internal combustion engines.

BACKGROUND

The statements in this section merely provide background information related to the present disclosure. Accordingly, such statements are not intended to constitute an admission of prior art.

Powertrain systems employ internal combustion engines and non-combustion torque machines to generate tractive torque, execute engine autostop/autostart routines and effect vehicle braking. Non-combustion torque machines include electric motor/generator devices that couple to the driveline via a transmission element or via an engine crankshaft. Internal combustion engines are equipped with subsystems to improve engine efficiency and reduce fuel consumption including, e.g., cylinder deactivation systems, variable valve activation systems including variable cam phasing systems and variable valve lift systems, and engine autostop/autostart systems. Internal combustion engines can be controlled to spin in an unfueled condition during specific vehicle operating conditions such as decelerations, referred to as deceleration fuel-cutoff (dFCO). Energy is expended to spin an unfueled engine, referred to as engine pumping loss or engine drag torque.

Vehicle deceleration events provide opportunities to capture and store energy from vehicle momentum, such as during regenerative braking when a non-combustion torque machine effects vehicle braking through the driveline. It is appreciated that more energy of momentum is available for regenerative capturing during a deceleration event when engine drag torque is minimized. Engine drag torque can be minimized by employing one or more of the aforementioned subsystems that improve engine efficiency.

A transition in an operating state of an engine subsystem can induce torque vibration that can be transferred to a vehicle passenger compartment. Torque vibrations may be more noticeable at different vehicle and engine speeds due to the vibration occurring at a resonant frequency.

SUMMARY

A method for operating an internal combustion engine includes increasing engine drag torque, transitioning from a cylinder deactivation state to an all-cylinder state, and decreasing engine drag torque immediately subsequent to transitioning to the all-cylinder state.

BRIEF DESCRIPTION OF THE DRAWINGS

One or more embodiments will now be described, by way of example, with reference to the accompanying drawings, in which.

DETAILED DESCRIPTION

Figure 1:
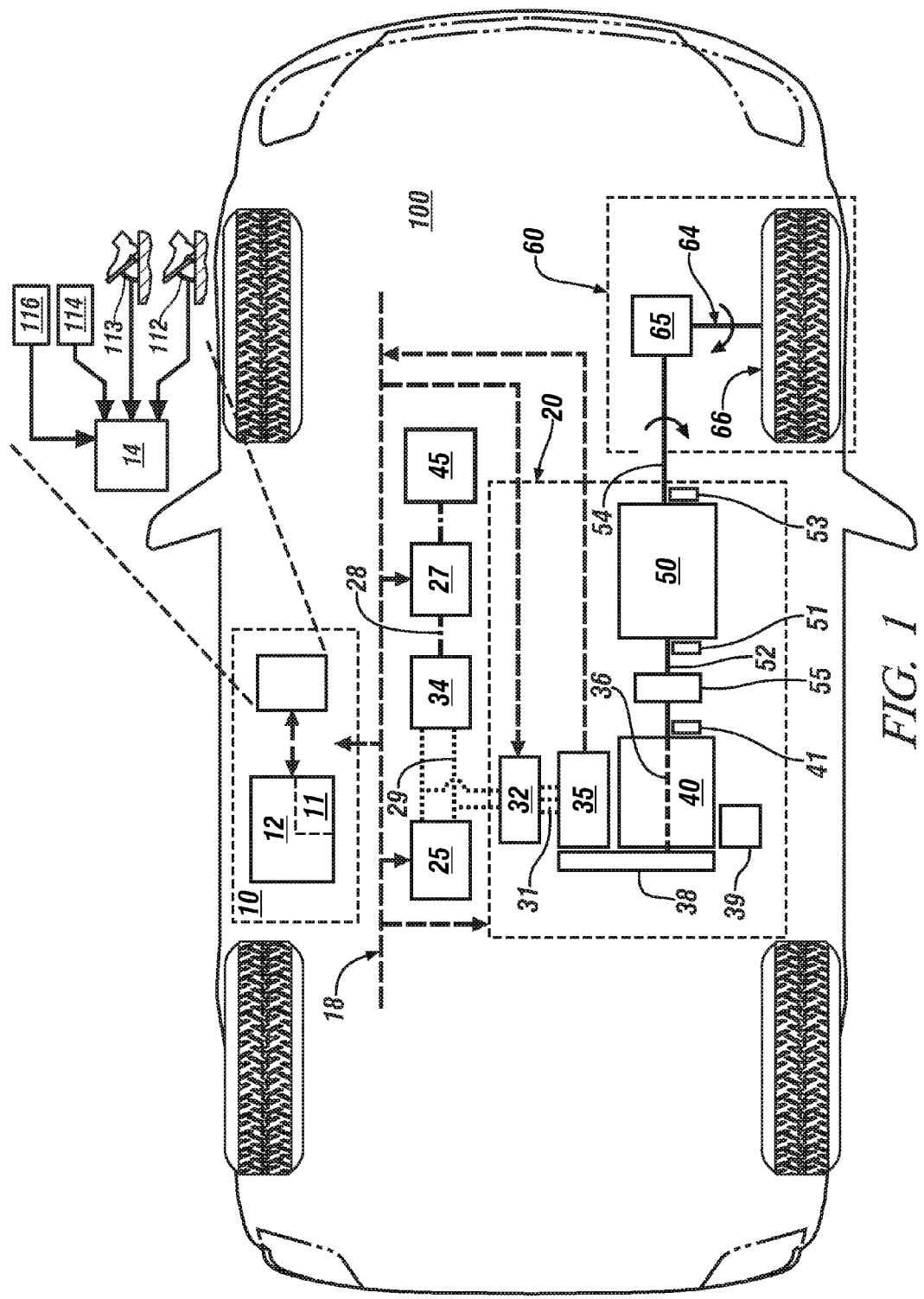
FIG. 1 illustrates a vehicle including a powertrain system including an engine and non-combustion torque machine coupled to a driveline and controlled by a control system, in accordance with the disclosure.

Referring now to the drawings, wherein the showings are for the purpose of illustrating certain exemplary embodiments only and not for the purpose of limiting the same, FIG. 1 illustrates a vehicle 100 including a powertrain system 20 coupled to a driveline 60 and controlled by a control system 10. Like numerals refer to like elements throughout the description. The powertrain system 20 includes torque-generating devices including an internal combustion engine 40 and a non-combustion torque machine 35 that transfer torque through a transmission 50 to the driveline 60. One configuration of the powertrain system 20 includes the torque machine 35 rotatably mechanically coupled to a crankshaft 36 of the engine 40 that rotatably mechanically couples through a fluidic torque coupling device (torque converter) 55 to an input member 52 of the transmission 50. The crankshaft 36 mechanically rotatably couples to the torque machine 35 via a pulley mechanism 38. Other configurations of the powertrain system 20 that include the torque machine 35 rotatably mechanically coupled to the engine 40 that mechanically couples to the transmission 50 may be employed within the scope of this disclosure.

The engine 40 is preferably a multi-cylinder internal combustion engine that converts fuel to mechanical torque through a thermodynamic combustion process. The engine 40 is equipped with a plurality of actuators and sensing devices for monitoring operation and delivering air, fuel and other combustion products to form a combustion charge to produce torque in response to an operator torque request, including a crank position sensor 41 that monitors rotational position and speed of the crankshaft 36. The engine 40 is configured to execute autostart and autostop control routines and fuel cutoff (FCO) control routines during ongoing operation of the powertrain system 20. The engine 40 is considered to be in an OFF state when it is not rotating. The engine 40 is considered to be in an ON state when it is rotating, including when operating under FCO control routines during which it is rotating and unfueled.

The engine 40 is configured with devices and controllers to control and manage airflow to individual cylinders, including a cylinder deactivation (AFM) system and an electronic throttle control (ETC) system. The engine 40 may also be configured with a variable cam phasing (VCP) system and a variable valve lift control (VLC) system. The AFM system includes hardware and an associated controller to control operation of the engine in one of an all-cylinder state and a cylinder deactivation state. One known engine that includes an AFM system includes an engine in a V8 configuration that operates all eight cylinders in the all-cylinder state and operates four of the cylinders and deactivates the other four cylinders in the cylinder deactivation state. The cylinder deactivation state includes operating with only a portion of the engine cylinders fueled and fired to generate torque. Operating in the cylinder deactivation state can include maintaining one or both the intake and exhaust engine valves of the deactivated cylinders in a closed state. The engine has better fuel efficiency when operating in the cylinder deactivation state but has a decreased maximum torque capacity as compared to operation in the all-cylinder state. The VLC system includes hardware and an associated controller to control operation of the engine in either a low-lift or a high-lift engine valve state. Operation in the low-lift state includes opening the engine intake valves to low-lift positions, e.g., 3-5 mm of travel, during the intake phase of the combustion cycle. The low-lift state is often coupled with a decreased duration of intake valve opening. Operation in the low-lift state results in decreased air flow into the engine as compared to operation in the high-lift state. Operation in the high-lift state includes opening the engine intake valves at high-lift positions, e.g., 10-12 mm of travel, during the intake phase of the combustion cycle. The high-lift state is often coupled with an increased duration of intake valve opening. Operation in the high-lift state results in increased air flow into the engine as compared to operation in the low-lift state. The engine has a decreased maximum torque capacity when operating in the low-lift state as compared to operation in the high-lift state, but may yield improved fuel efficiency when coupled with other engine operating strategies such as homogeneous-charge compression ignition operation.

The non-combustion torque machine 35 includes a high-voltage multi-phase electric motor/generator configured to convert stored electric energy to mechanical power and convert mechanical power to electric energy that may be stored in a high-voltage battery 25 in one embodiment. The torque machine 35 includes a rotor and a stator and an accompanying position sensor. In one embodiment, the electrically-powered torque machine 35 includes an output member that mechanically rotatably couples to the crankshaft 36 of the engine 40 via the pulley mechanism 38. The pulley mechanism 38 is configured to effect torque transfer between the engine 40 and the torque machine 35, including torque transfer from the torque machine 35 to the engine 40 to operate under engine autostart and autostop, tractive torque assistance, and vehicle braking control routines. The pulley mechanism 38 also effects torque transfer from the engine 40 to the torque machine 35 for high-voltage electrical charging. In one embodiment, the pulley mechanism 38 includes a serpentine belt routed between a first pulley attached to the crankshaft 36 of the engine 40 and a second pulley attached to a rotating shaft coupled to a rotor of the torque machine 35, referred to as a belt-alternator-starter (BAS) system. Alternatively, the pulley mechanism 38 may include a positive-displacement gearing mechanism, or another positive mechanical connection. The engine 40 may include a low-voltage solenoid-actuated electrical starter 39 for engine starting in response to a key-crank event in one embodiment.

The high-voltage battery 25 electrically connects to an inverter module 32 via a high-voltage DC bus 29 to transfer high-voltage electric power to the torque machine 35 in response to control signals originating in the control system 10. The inverter module 32 electrically connects to the torque machine 35 via a multi-phase motor control power bus 31. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 preferably employs pulse width-modulating (PWM) control to convert stored DC electric power originating in the high-voltage battery 25 to AC electric power to drive the torque machine 35 to generate torque. Similarly, the inverter module 32 converts mechanical power transferred to the torque machine 35 to DC electric power to generate electric energy that is storable in the high-voltage battery 25, including as part of a regenerative control strategy. The inverter module 32 is configured to receive motor control commands and control inverter states to provide the motor drive and regeneration functionality. In one embodiment, a DC/DC electric power converter 34 electrically connects to a low-voltage bus 28 and a low-voltage battery 27, and electrically connects to the high-voltage bus 29. Such electric power connections are known and not described in detail. The low-voltage battery 27 electrically connects to an auxiliary power system 45 to provide low-voltage electric power to low-voltage systems on the vehicle, including, e.g., electric windows, HVAC fans, seats, and the low-voltage solenoid-actuated electrical starter 39.

The transmission 50 may be configured, by way of example, as an automatic transmission, a dual clutch transmission, a clutchless manual transmission and a manual transmission. The transmission 50 is configured to operate in one of a plurality of selectable fixed-gear operating modes to operate at a gear ratio that achieves a preferred match between an operator torque request and an engine operating point, and preferably employs one or a plurality of differential gear sets and hydraulically-activated clutches to effect torque transfer in one of a plurality of selectable operating modes over a range of speed ratios between the input member 52 and output member 54. The transmission 50 executes upshifts to shift to an operating mode having a lower numerical multiplication ratio (gear ratio) and executes downshifts to shift to an operating mode having a higher numerical multiplication ratio. A transmission upshift requires a reduction in engine speed so the engine speed matches transmission output speed multiplied by the gear ratio at a gear ratio associated with the target operating mode. A transmission downshift requires an increase in engine speed so the engine speed matches transmission output speed multiplied by the gear ratio at a gear ratio associated with the target operating mode. A first rotational position/speed sensor 51 monitors transmission input speed using rotation of the input member 52 and a second rotational position/speed sensor 53 monitors transmission output speed using rotation of the output member 54.

The torque converter 55 is a two-pass fluidic torque coupling device in one embodiment that includes an impeller, a stator, turbine, and a controllable locking clutch. The controllable locking clutch interacts between the impeller and the turbine, and is configured to operate in one of an unlocked state, a controlled slip state, and a locked state to manage relative rotation of the impeller and the turbine. The locked state is an operating state in which the rotation of the impeller is locked to the rotation of the turbine, causing the rotation of the engine to be locked to the rotation of the transmission and driveline. The controlled slip state is an operating state wherein the controllable locking clutch is partially applied to transfer torque at a preferred magnitude of rotational slip between the impeller and the turbine, with the magnitude of rotational slip controlled by controlling hydraulic pressure in the torque converter. Other design features of a torque converter are known and not discussed in detail herein. Alternatively, the torque converter 55 can be a three-pass device. The torque converter 55 operates as an automatic clutch element to transfer torque between the engine 40 and the transmission 50. The torque converter 55 provides a mechanical buffer between the engine 40 and the transmission 50, acting to absorb torsional vibrations of the engine 40, transmission 50, and driveline 60. The torque converter 55 may also act to dampen variations in the engine speed under certain conditions including those associated with engine speed flaring during engine starting events and individual cylinder firing events at low engine speeds.

The driveline 60 may include a differential gear device 65 that mechanically couples to an axle 64, transaxle or halfshaft that mechanically couples to a wheel 66 in one embodiment. The driveline 60 transfers tractive power between the transmission 50 and a road surface.

The control system 10 includes control module 12 that signally connects to an operator interface 14 and employs control routines 11. The control module 12 preferably includes a plurality of discrete devices that are co-located with the individual elements of the powertrain system 20 to effect operational control of the individual elements of the powertrain system 20. The control module 12 may also include a control device that provides hierarchical control of other control devices. The control module 12 signally and operatively connects to each of the high-voltage battery 25, the inverter module 32, the torque machine 35, the engine 40 and the transmission 50 either directly or via communications bus 18 to monitor operation and determine parametric states thereof. The operator interface 14 of the vehicle 100 is a controller that signally connects to a plurality of human/machine interface devices through which the vehicle operator requests operation of various systems of the vehicle 100. The human/machine interface devices are devices that provide operator requests for vehicle operation including, e.g., an accelerator pedal 112, which provides an operator requested acceleration signal (APP); a brake pedal 113, which provides an operator requested braking signal (BPP); a transmission range selector 114, which provides an operator requested transmission range signal (PRNDL); and a vehicle speed cruise control system 116, which provides an operator request for vehicle speed (CRUISE). Other human/machine interface devices preferably include an ignition switch to enable an operator to initiate vehicle operation, including cranking and starting the engine 40, a steering wheel, and a headlamp switch. The transmission range selector 114 provides signal input indicating direction of operator-requested motion of the vehicle including a discrete number of operator-selectable positions indicating the preferred rotational direction of the output member 54 of either a forward or a reverse direction. It is appreciated that the vehicle may still move in a direction other than the indicated direction of operator-requested motion due to rollback caused by location of a vehicle, e.g., on a hill.

The powertrain system 20 includes a communications scheme including the communications bus 18 to effect communications in the form of sensor signals and actuator command signals between the control system 10 and elements of the powertrain system 20. The communications scheme employs one or more communications systems and devices, including, e.g., the communications bus 18, a direct connection, a local area network bus, a serial peripheral interface bus, and wireless communications to effect information transfer.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, example each 100 microseconds, 3.125, 6.25, 12.5, 25 and 100 milliseconds during ongoing engine and vehicle operation. Alternatively, routines may be executed in response to occurrence of an event.

Vehicle operation responsive to the operator requests includes operating modes of accelerating, braking, coasting, and idling. The accelerating mode includes an operator request to increase vehicle speed. The braking mode includes an operator request to decrease vehicle speed, which can be accomplished with braking torque that originates from either or both friction braking from mechanical brake elements that are located at the vehicle wheels and reactive braking from the powertrain system through the driveline. The coasting mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The idle mode includes vehicle operation wherein vehicle speed is at or near zero with the transmission range selector in a non-propulsion range, or in one of the propulsion ranges with the operator request including zero input to the accelerator pedal and minimal or slight input to the brake pedal.

The engine is configured to operate in a deceleration fuel cutoff (dFCO) state when the vehicle is in the coasting mode and when the vehicle is in the braking mode under some conditions. The dFCO state includes operating with the crankshaft of the engine rotating and with the engine in an unfueled state, thus without forming or firing cylinder charges. The dFCO state includes an extended dFCO state, which further includes operating the AFM system in the cylinder deactivation state and operating the ETC system with the throttle near a wide-open position allowing pressure in the engine intake manifold to be near atmospheric pressure. Such engine operation leads to reduced engine drag torque during the coasting and braking modes.

While operating the engine in the extended dFCO state with the torque converter in a locked state, the powertrain system can operate in a regenerative braking mode including operating the torque machine in the electric power generation mode to provide powertrain braking to the driveline. At some point during vehicle deceleration, the torque converter clutch can be unlocked to decouple direct rotation of the driveline wheels from the rotation of the engine and permit torque transfer with slippage thereacross. This prevents engine stalling and reduces propagation of unwanted driveline shudder and engine vibration to the vehicle passenger compartment.

When the torque converter clutch is unlocked, a positive crankshaft torque is necessary to sustain the engine speed if the turbine speed is below a desired engine speed. Under some operating conditions such as an accelerator pedal tip-in, the dFCO state may be discontinued and fueled engine operation may commence. Under other conditions, the vehicle may approach a stopped condition accompanied by execution of an autostop control routine to shutdown the engine. The engine operates in the dFCO state for fuel economy and pleasability/driveability until the autostop control routine is triggered.

One vehicle operating scenario includes executing vehicle braking to achieve a stopped vehicle condition, such as at a STOP sign or a traffic light. The engine preferably stops, i.e., operates under the autostop control routine to achieve the OFF state when the vehicle stops. However, the engine must be functioning with the AFM system in the all-cylinder state to execute a subsequent autostart control scheme. Thus, the engine operating routine executes a transition from the cylinder deactivation state to the all-cylinder state prior to executing the autostop control scheme. Preferably, this transition occurs without fueling and firing the engine and its attendant fuel and driveability penalties.

Figure 2:
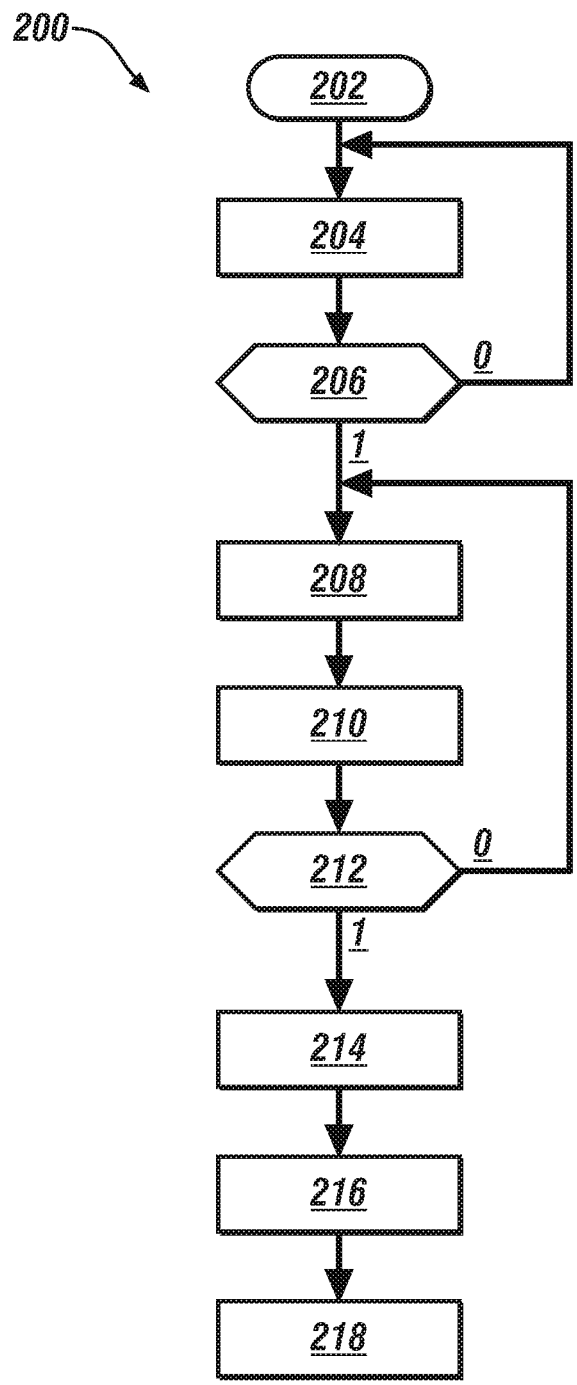
FIG. 2 illustrates an active airflow control scheme for controlling operation of the powertrain system of FIG. 1, in accordance with the disclosure.

FIG. 2 illustrates an active airflow control scheme (control scheme) 200 for controlling operation of the powertrain system 100 of FIG. 1 that preferably includes the engine 20 configured with control systems effecting operation in a cylinder deactivation state, including AFM and ETC systems or other engine airflow control systems. In response to an operator request for vehicle coasting, powertrain operation includes operating the engine in a dFCO state with the AFM system in a cylinder deactivation state, preferably with the ETC system holding the throttle at an open position that minimizes drag torque. The engine preferably spins thusly until there is a command to discontinue operating in the cylinder deactivation state, which may be part of a control routine to enable engine autostop execution. The system coordinates an increased engine drag torque with a command to transition from the cylinder deactivation state to the all-cylinder state to minimize torque disturbances caused by the transition. The control scheme 200 of FIG. 2 is described with reference to Table 1, which is provided as a key wherein the numerically labeled blocks and the corresponding functions are set forth as follows.

TABLE 1

| BLOCK | BLOCK CONTENTS |
| --- | --- |
| 202 | Start |
| 204 | Operate powertrain system in dFCO including operating the engine in cylinder deactivation state |
| 206 | Is there a command to operate engine in all-cylinder state? |
| 208 | Command increase in engine drag torque while operating engine in cylinder deactivation state |
| 210 | Command engine intake manifold pump down |
| 212 | Has engine drag torque increased sufficiently? |
| 214 | Transition engine operation to all-cylinder state |
| 216 | Decrease engine drag torque and Increase intake manifold pressure |
| 218 | Execute engine autostop |

The control scheme 200 initiates operation in response to operator commands including APP that is at or near 0% allowing for pedal sensor debounce and BPP that is preferably greater than 0% indicating the operator intends on braking to a stopped state, including at a low BPP level while the vehicle speed is greater than a minimum value, e.g., 16 kph (10 MPH) (202). The engine operates in the dFCO state with the cylinder deactivation state enabled and the ETC controlling the throttle in an opened state (204). Controlling the throttle in an opened state preferably includes controlling the throttle at a value less than wide-open throttle (WOT), e.g., at a value near 60% of WOT. Preferably, the torque converter clutch is locked to permit vehicle momentum to be directly transferred to the torque machine for electric power regeneration. This operation continues (206)(0) until the operator provides input to the APP to command vehicle acceleration or until there is a command to operate the engine in the all-cylinder state in preparation for executing an engine autostop control routine (206)(1) to effect vehicle operation in the idle mode. Executing the engine autostop control routine can be associated with operating the vehicle in the idle mode and an imminent stopping of movement of the vehicle, or can be based upon other vehicle, powertrain and engine operating criteria.

Preparing to operate the engine in the all-cylinder state includes a command to increase the engine drag torque while operating the engine in cylinder deactivation state (208) to pump down the pressure in the intake manifold (210). The increase in the engine drag torque is coordinated with the command to transition from the cylinder deactivation state to the all-cylinder state to minimize torque disturbances caused by the transition. Increasing the engine drag torque includes executing engine control commands to restrict airflow through the engine. Such engine control commands include operating the ETC to close the throttle to a low state, e.g., to a value between 10% and 20% WOT. Such engine control commands can further include controlling a VLC system to further restrict airflow through the engine, which may include controlling operation of the engine in the low-lift engine valve state on engines so equipped. Such engine control commands can further include controlling the VCP system to control intake and/or exhaust cam phasing of the engine to restrict airflow through the engine, which may include minimizing or eliminating intake/exhaust valve overlap on systems so equipped.

The commanded increase in engine drag torque continues until the engine drag torque increases to a predetermined threshold level indicated by the intake manifold pressure (212), at which time (212)(1) the engine executes a command to transition to operating in the all-cylinder state (214). A threshold level for the engine drag torque as indicated by the intake manifold pressure is preferably associated with a manifold pressure at which significant engine misfire occurs, which can be a manifold pressure of 20 kPa-abs in one embodiment. After executing the transition to the all-cylinder state, the engine drag torque is decreased and the intake manifold pressure is increased (216) by executing engine control commands to increase airflow through the engine, including operating the ETC to open the throttle to the high state, e.g., to 80% WOT, and controlling the VLC system to control operation of the engine in the high-lift engine valve state and controlling the VCP system to control intake and/or exhaust cam phasing of the engine to achieve intake/exhaust valve overlap on systems so equipped. Such actions are in preparation for executing the engine autostop control routine (218), which can be accomplished when all conditions are met.

Thus, torque disturbances associated with a change in the variable torque capacity of the engine caused by a change between operating in the cylinder deactivation state and operating in the all-cylinder state can be mitigated or eliminated by manipulating the engine throttle control to manipulate the engine drag torque. This includes simultaneously opening the throttle to reduce the drag torque to mitigate a transition to the full torque capacity associated with the all-cylinder state. In a similar manner, the torque disturbance can be reduced by simultaneously closing the throttle to increase the engine drag torque to mitigate a transition to the decreased torque capacity associated with the cylinder deactivation state.

Figure 3:
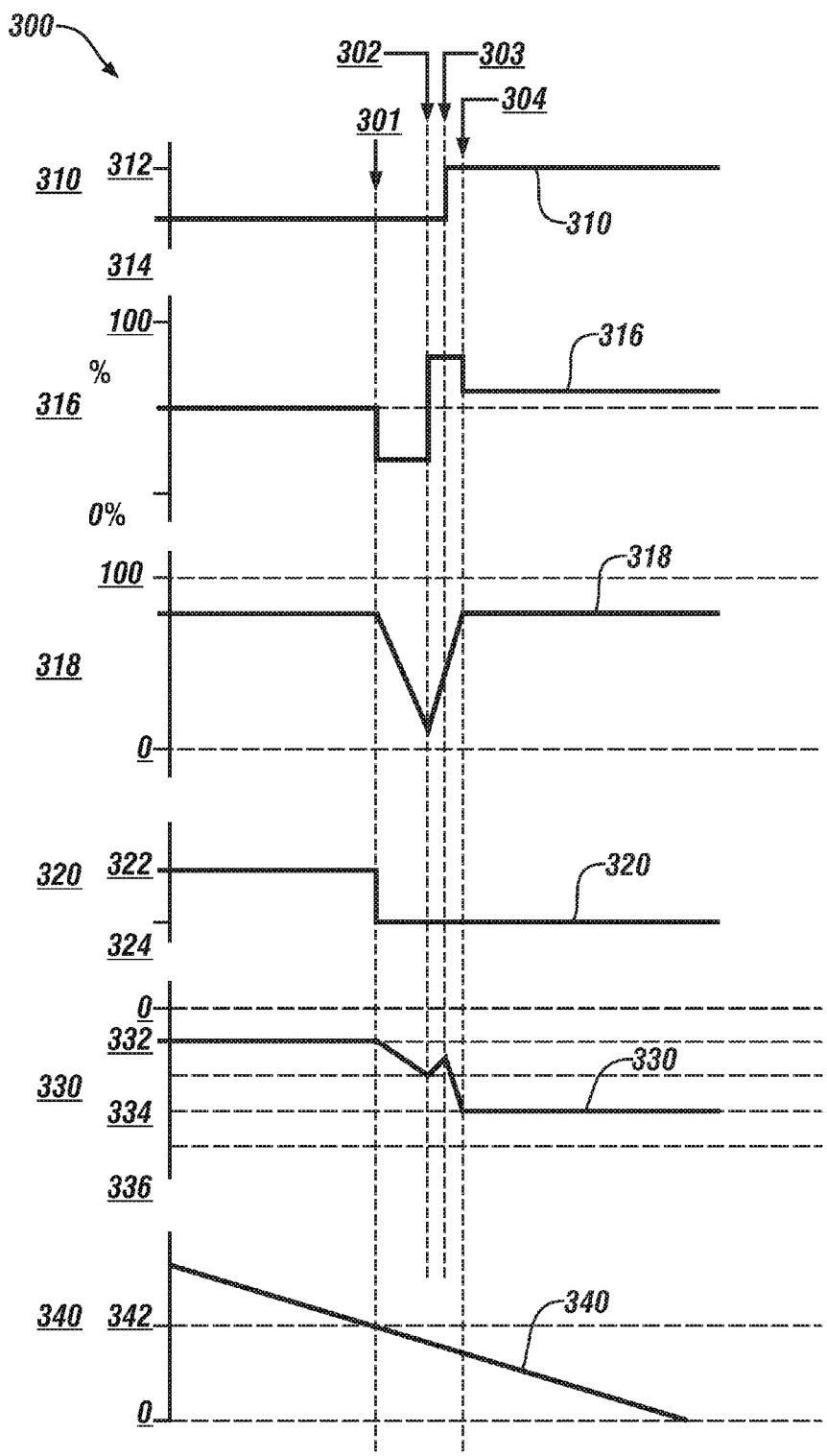
FIG. 3 illustrates operation of a vehicle including a powertrain system employing the active airflow control scheme of FIG. 2, in accordance with the disclosure.

FIG. 3 illustrates operation of an internal combustion engine employing the active airflow control scheme 200 of FIG. 2. The graphed parameters include AFM state (All cylinder 312/deactivation 314) 310, ETC throttle position (% WOT) 316, intake manifold pressure or MAP (kPa-abs) 318, torque converter clutch activation state (ON 322/OFF 324) 320, engine drag torque (Nm) 330, and vehicle speed (km/h) 340. All are coincidently shown in relation to time on the horizontal axis.

The engine drag torque 330 corresponds to an air per cylinder (APC) determination. When the engine is operating in the dFCO state, there is a requirement for engine airflow that is associated with non-engine operation functions. Engine airflow can translate to APC values in the all-cylinder state and the cylinder deactivation state, including a required APC for brake booster vacuum, a required APC for exhaust aftertreatment protection, and a required APC for noise, vibration, and harshness (NVH) management.

Prior to time 301, the powertrain system is operating in a dFCO state, which includes operating the engine in the cylinder deactivation state, which is indicated by the AFM state 310 in the cylinder deactivation state 314. The ETC throttle position 316 is opened to near 60%, and MAP 318 is at or near 80 kPa-abs, which is less than ambient barometric pressure as indicated at 100 kPa-abs. Prior to time 301, the torque converter clutch activation state transitions from the ON state 322 to the OFF state 324 as the torque converter clutch is deactivated. Deactivating the torque converter clutch allows the torque converter to absorb engine torque vibration occurring at low engine speeds. In response, the engine drag torque 330 achieves a minimum torque state 332 for operation in the cylinder deactivation state 314. The vehicle is coasting with the vehicle speed 340 decreasing at or near a constant rate.

At time 301, the vehicle speed 340 decreases to less than a threshold speed 342, wherein the threshold speed 342 indicates a need to prepare for executing an engine autostop control routine, which is associated with a transition to operating in the idle mode and an imminent stopping of movement of the vehicle in this scenario. The ETC throttle position 316 is commanded to close the throttle to a position that near a closed throttle position, shown at a 20% throttle position, with a corresponding decrease in MAP 318, resulting in an increase in the engine drag torque 330, which approaches a maximum engine drag torque 334 for operation in the cylinder deactivation state 314.

At time 302, the ETC throttle position 316 is commanded to rapidly open the throttle to a position that near an open throttle position, shown at an 80% throttle position, with a corresponding increase in MAP 318. Immediately subsequent to the change in the ETC throttle position 316 and coincident with the increase in MAP 318, the AFM state 310 transitions from the cylinder deactivation state 314 to the all-cylinder state 312, which occurs at time 303. This transition process allows for preparation to change the AFM state that accommodates manifold fill times and cylinder fill times, including increasing the airflow to accommodate the increase in quantity of activated cylinders, thus minimizing unwanted engine vibration and other transitional disturbances. The changes in the ETC throttle position 316 (and VCP and VLC when employed) can occur nearly instantaneously in response to commands from the control system, but there are response lags associated with airflow into the intake manifold and engine cylinders that cause delays in the MAP 318 that need to be managed through the control routines that are shown.

The ETC throttle position 316 is reduced soon thereafter at time 304 to an open position that is greater than the open position for operating in the cylinder deactivation state. During this process, the engine drag torque 330 may initially increase, but then decrease to a minimum engine drag torque associated with operating in the all-cylinder state 336 with the change in the ETC throttle position 316. The powertrain system is now operating with the engine operating in the all-cylinder state 336, which permits the powertrain system to execute an autostop control routine. When the extended dFCO state is enabled the torque converter is held in a locked state to lower vehicle speeds to avoid losses in spinning the engine using the electric motor with the fuel off. When extended dFCO state is disabled or aborted, the torque converter will typically be opened at a higher vehicle speed point to remove the tight coupling between the engine and transmission for low speed drivability maneuvers. When the extended dFCO state is disabled or aborted, it is typical that the idle speed will be higher for the same gear and vehicle speed combination. Because of the earlier torque converter release and higher idle speed target when the extended dFCO state is disabled, the system that determines the zero accelerator pedal torque will have to have different profiles for the same gear or vehicle speed.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an internal combustion engine, comprising:
   controlling the internal combustion engine in a deceleration fuel cutoff mode and a cylinder deactivation state in response to an operator request for coasting;
   monitoring an engine operation command;
   increasing engine drag torque while operating the engine in cylinder deactivation state, comprising closing an engine throttle to a low state, when the monitored engine operation command commands engine operation in an all-cylinder state;
   transitioning from the cylinder deactivation state to an all-cylinder state while remaining in the deceleration fuel cutoff mode;
   decreasing engine drag torque directly subsequent to transitioning to the all-cylinder state; and
   executing an engine autostop.

2. The method of claim 1, wherein increasing the engine drag torque comprises increasing the engine drag torque to a predetermined level.

3. The method of claim 1, wherein increasing engine drag torque further comprises controlling a variable engine valve lift control system to restrict engine airflow.

4. The method of claim 3, wherein controlling the variable engine valve lift control system to restrict engine airflow comprises controlling the variable engine valve lift control system to a low-lift engine valve state.

5. The method of claim 1, wherein increasing engine drag torque further comprises controlling a variable cam phasing system to restrict engine airflow.

6. The method of claim 5, wherein controlling the variable cam phasing system to restrict engine airflow comprises controlling the variable cam phasing system to control cam phasing of the engine to eliminate engine valve overlap.

7. Method for operating a powertrain system, comprising:
   operating the powertrain system in one of a coasting mode and a braking mode, including controlling an internal combustion engine in a deceleration fuel cutoff mode and a cylinder deactivation state and controlling a torque converter clutch in a locked state; and
   monitoring an engine operation command;
   increasing engine drag torque while operating the engine in cylinder deactivation state, comprising closing an engine throttle to a low state, when the monitored engine operation command commands engine operation in an all-cylinder state;

transitioning from the cylinder deactivation state to an all-cylinder state while controlling the internal combustion engine in the deceleration fuel cutoff mode;
decreasing the engine drag torque immediately subsequent to transitioning to the all-cylinder state;
unlocking the torque converter clutch; and
executing an engine autostop.

8. The method of claim 7, wherein increasing the engine drag torque comprises increasing the engine drag torque to a predetermined level.

9. The method of claim 7, wherein increasing engine drag torque further comprises controlling a variable engine valve lift control system to restrict engine airflow.

10. The method of claim 7, wherein increasing engine drag torque further comprises controlling a variable cam phasing system to restrict engine airflow.

* * * * *